United States Patent
Dipin

(10) Patent No.: US 10,642,466 B2
(45) Date of Patent: May 5, 2020

(54) METHOD AND SYSTEM FOR CONTEXT BASED TAB MANAGEMENT

(71) Applicant: Samsung Electronics Co., Ltd., Suwon-si, Gyeonggi-do (KR)

(72) Inventor: Kollencheri Puthenveetil Dipin, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 15/185,409

(22) Filed: Jun. 17, 2016

(65) Prior Publication Data

US 2017/0293419 A1     Oct. 12, 2017

(30) Foreign Application Priority Data

Jun. 23, 2015 (IN) ............................ 3155/CHE/2015
Apr. 11, 2016 (IN) ............................ 3155/CHE/2015
May 25, 2016 (KR) ........................ 10-2016-0064145

(51) Int. Cl.
*G06F 3/048* (2013.01)
*G06F 16/00* (2019.01)
*G06F 3/0484* (2013.01)
*G06Q 10/10* (2012.01)
*G06F 3/0483* (2013.01)
*G06F 16/957* (2019.01)
*G06F 3/0482* (2013.01)

(52) U.S. Cl.
CPC ........ *G06F 3/04847* (2013.01); *G06F 3/0482* (2013.01); *G06F 3/0483* (2013.01); *G06F 3/04842* (2013.01); *G06F 16/957* (2019.01); *G06Q 10/10* (2013.01)

(58) Field of Classification Search
CPC ......... G06F 3/048; G06F 16/957; H04L 67/02
See application file for complete search history.

(56) References Cited

U.S. PATENT DOCUMENTS

| 8,191,007 B1 * | 5/2012 | Veloz, III | G06F 16/957 715/777 |
| 8,881,032 B1 | 11/2014 | Weber et al. | |
| 9,424,102 B2 * | 8/2016 | Boenisch | G06F 9/48 |
| 9,569,412 B1 * | 2/2017 | Broomhall | G06F 16/957 |
| 10,387,546 B1 * | 8/2019 | Duran | G06F 17/2247 |
| 2008/0005686 A1 | 1/2008 | Singh | |

(Continued)

OTHER PUBLICATIONS

Adobe Acrobat Help/Adjusting PDF views, Nov. 3, 2014, p. 3 A page-view box in a page thumbnail (Year: 2014).*

*Primary Examiner* — Mahelet Shiberou
(74) *Attorney, Agent, or Firm* — Jefferson IP Law, LLP

(57) ABSTRACT

A method and apparatus for tab management in a web browser are provided. The method includes identifying browsing contexts for at least one tab among tabs that are open on the web browser, creating tab groups, based on the identified browsing contexts, and then adding the tab or tabs to one or more of the created tab groups, and displaying tab groups to a user. The method further includes allowing the user to navigate through the tabs in selected tab groups, by providing a suitable interface, displaying tabs corresponding to browsing context of the selected tab groups by using different user interfaces, and allowing a user to navigate between the tabs corresponding to the browsing context as well as tabs that differ from each other.

15 Claims, 16 Drawing Sheets

(56) References Cited

U.S. PATENT DOCUMENTS

| | | | |
|---|---|---|---|
| 2009/0125837 A1* | 5/2009 | Hatem | G06F 3/0483 |
| | | | 715/788 |
| 2009/0327947 A1 | 12/2009 | Schreiner et al. | |
| 2011/0131523 A1* | 6/2011 | Grant | G06F 3/0481 |
| | | | 715/777 |
| 2012/0131485 A1* | 5/2012 | Svendsen | G06F 3/0483 |
| | | | 715/769 |
| 2012/0271941 A1 | 10/2012 | Mirandette et al. | |
| 2012/0331408 A1 | 12/2012 | Ainslie et al. | |
| 2014/0099034 A1* | 4/2014 | Rafati | G06K 9/00751 |
| | | | 382/209 |
| 2014/0164960 A1* | 6/2014 | Kuo | G06F 17/30899 |
| | | | 715/760 |
| 2015/0205462 A1* | 7/2015 | Jitkoff | G06F 16/955 |
| | | | 715/777 |
| 2015/0220228 A1* | 8/2015 | Podemsky | G06F 3/0483 |
| | | | 715/744 |
| 2015/0346929 A1* | 12/2015 | Karunamuni | G06F 3/0483 |
| | | | 715/777 |
| 2016/0139750 A1* | 5/2016 | Barrus | G06F 3/0483 |
| | | | 715/777 |
| 2017/0199638 A1* | 7/2017 | Bhupatiraju | G06F 17/30905 |
| 2018/0307768 A1* | 10/2018 | Hu | G06F 3/0483 |

* cited by examiner

METHOD AND SYSTEM FOR CONTEXT BASED TAB MANAGEMENT

CROSS-REFERENCE TO RELATED APPLICATION(S)

This application claims the benefit under 35 U.S.C. § 119(a) of an Indian Provisional patent application filed on Jun. 23, 2015 in the Indian Patent Office and assigned Serial number 3155/CHE/2015, an Indian patent application filed on Apr. 11, 2016 in the Indian Patent Office and assigned Serial number 3155/CHE/2015, and a Korean patent application filed on May 25, 2016 in the Korean Patent Office and assigned Serial number 10-2016-0064145, the entire disclosure of each of the applications above are hereby incorporated by reference.

TECHNICAL FIELD

The present disclosure relates to web browsing tabs. More particularly, the present disclosure relates to context based tab management in browsing tabs.

BACKGROUND

Portable electronic devices including smartphones, tablet personal computers (PCs), etc. are very popular and have become multi-purpose devices by supporting multiple applications such as Internet browsing, in addition to their calling and messaging functions. In fact, latest mobile marketing statistics indicate that more than 80% of Internet users around the globe access the Internet through mobile devices, predominantly using their smartphones.

Web browsers need to be optimized to support use by such mobile devices. Many mobile browsers are currently available, and they are constantly being updated and modified to enhance user experience. However, there are certain disadvantages for the browsers installed on the mobile devices, as compared to their own big screen versions (i.e., desktop personal computers and large-screen tablets).

One such disadvantage is that the existing mobile browsers are not optimized to allow smooth navigation between tabs. For example, while browsing, a user may open a number of tabs, each of them containing related, or a totally new context. When many of such tabs are open on a browser, the user may find it difficult to navigate between the different tabs that are open at a time.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method to allow context based grouping of web-browser tabs.

Another aspect of the present disclosure is to provide a method for adding tabs in which same or similar context based pages are open, to a specific tab group.

Another aspect of the present disclosure is to provide a method for allowing navigation between different tabs in a tab group.

In accordance with an aspect of the present disclosure, a method for tab management in a browser is provided. The method includes identifying sub-browsing context for each of a plurality of tabs that are open on the browser, by a tab manager of the browser. The tab manager further creates at least one tab group based on the identified sub-browsing context, and then assigns each of the plurality of tabs to the tab group. Further, the at least one tab is displayed to a user, by the tab manager.

In accordance with another aspect of the present disclosure, a method of navigating by a user between a plurality of tabs in a tab group in a browser is provided. The method includes displaying the tab group to the user, by the tab manager. The tab manager, upon receiving a user selection pertaining to a particular tab among the plurality of tabs in the tab group, displays the particular tab to the user.

In accordance with another aspect of the present disclosure, a system for tab management in a browser is provided. The tab management by the system includes identifying sub-browsing context for each of a plurality of tabs that are open on the browser, by a tab manager of the browser. The tab manager further creates at least one tab group based on the identified sub-browsing context, and then assigns each of the plurality of tabs to the at least one tab group. Further, the at least one tab is caused to be displayed to a user, by the tab manager.

In accordance with another aspect of the present disclosure, a system for navigating by a user between a plurality of tabs in a tab group in a browser is provided. The tab management by the system includes displaying the tab group to the user, by the tab manager. The tab manager, upon receiving a user selection pertaining to a particular tab among the plurality of tabs in the tab group, displays the particular tab to the user.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
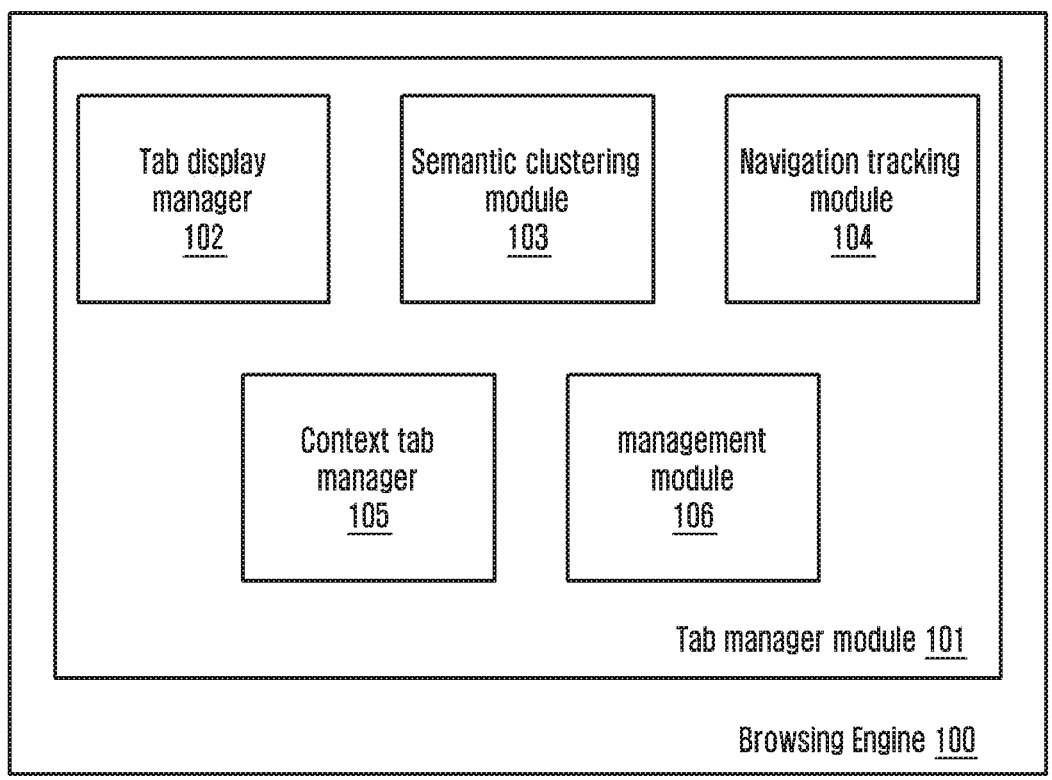
FIG. 1 illustrates a block diagram of a browsing engine in a user equipment (UE) that supports context based web-browsing, according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein disclose a mechanism for context based grouping of tabs in a web-browser. Referring now to the drawings, and more particularly to FIGS. 1 2, 3, 4A, 4B, 4C, 5A, 5F, 6, 7A, and 7B, where similar reference characters denote corresponding features consistently throughout the figures.

FIG. 1 illustrates a block diagram of a browsing engine in a user equipment (UE) that supports context based web-browsing, according to an embodiment of the present disclosure.

Referring to FIG. 1, the browsing engine 100 comprises of a tab manager module 101, in addition to standard browser components. The UE can be any device that has an active Internet connection, and that can support a web-browser for browsing and/or download purposes. For example, the UE can be a smartphone, or a tablet personal computer (PC).

The browsing engine 100 can be configured to provide at least one suitable option for a user to interact with a web browser installed in the UE, and browse web pages. The browsing engine 100 hosts the tab manager module 101 that provides suitable options for a user to increase and/or decrease the number of tabs in the browser, as per requirements. The number of tabs that can be supported by the browser can vary according to various implementation standards.

The tab manager module 101 can be configured to identify sub-browsing contexts for all the tabs that are open on the browser at any moment, and create different tab groups based on the identified sub-browsing contexts. The term 'sub-browsing context' refers to multiple independent browsing contexts that are part of a single browsing session. Further, web pages pertaining to a single context may be open on more than one tab. The tab manager module 101 can be configured to add all tabs, containing content matching a particular context, to a tab group corresponding to the context, automatically and/or manually. The tab manager can be further configured to cause to display the tab groups to the user, and provide suitable options for the user to navigate between different tab groups, and between different tabs in any selected tab group.

The tab manager module 101 is capable of including one or more of the following: a tab display manager 102, a semantic clustering module 103, a navigation tracking module 104, a context tab manager 105, and a sub-context management module 106. The tab display manager 102 can be configured to manage the display of contents using one or more tabs and/or tab groups, to the user. The tab display manager 102 can further be configured to provide at least one option for the user to optimize standard display settings.

The semantic clustering module 103 can be configured to perform semantic analysis of contents of all tabs that are open on the browser, and provide the results of the semantic analysis to the sub-context management module 106. The semantic clustering module 103 can be configured to use any suitable semantic analysis algorithm to perform semantic analysis of contents of the tabs. It should be understood that the present disclosure is not limited to types of semantic analysis algorithms to perform semantic analysis. For example, in an embodiment, the semantic analysis algorithm can analyze characters contained in a content in a particular tab and perform semantic analysis of the content based on the analysis result. In another embodiment, the semantic analysis algorithm can analyze images or moving images contained in a content in a particular tab and perform semantic analysis of the content based on the analysis result. Semantic analysis will be described in detail later referring to FIG. 3.

The navigation tracking module 104 can be configured to monitor user actions on all tabs that are open, and identify navigation from one webpage to another, in any of the tabs being monitored and analyzed. For example, the user may click on a hyperlink contained in a first web page displayed on the screen using a first tab, and navigate a second web page corresponding to the hyperlink using a second tab. That is, the first tab is a parent tab and the second tab is a child tab. In this case, the navigation tracking module 104 can track and identify the tab (first tab) from which the navigation has been initiated, and the tab (second tab) which has been opened as a result of the navigation. The information regarding the relationship between the first and second tabs may also be provided to the sub-context tab management module 106.

The context tab manager 105 can be configured to manage arrangements and display of all tabs that are open on the browser. For example, the tab manager can provide options for the user to change the order in which the tabs are placed in the web browser.

The sub-context management module 106 can be configured to collect inputs from the semantic clustering module 103, and the navigation tracking module 104. The sub-context management module 106 is capable of analyzing the collected information, and identifying sub-browsing contexts for the tabs that are open on the browser.

The sub-context management module 106 is capable of identifying sub-browsing context for all tabs open on the web browser and distinguishing tab groups from each other via a tab group corresponding to the identified sub-browsing context, based on the identified sub-browsing context. The sub-context management module 106 may add tabs to a tab group corresponding to a tab-related sub-browsing context and also provide options for the user to navigate between tab groups and tabs. The sub-context management module 106 can be further configured to provide an option for a user to open a new tab, and associate the newly opened tab to an active sub-browsing context, and to the corresponding tab group, using a suitable user interface. The sub-context management module 106 can be further configured to add the tab that the user selected, to the corresponding tab group, and then provide the appropriate viewing options for the user, along with other tabs in the tab group. For example, while adding a newly created tab to an active group, the user can use a uniform resource locator (URL) based mechanism, and/or a gesture based mechanism, or any such suitable user interface. In various embodiments, the sub-context management module 106 can be configured to use at least one of the following: the semantic analysis data, navigational data, and the data pertaining to manual tab addition or change(s) by the user, so as to identify the sub-browsing contexts.

Figure 2:
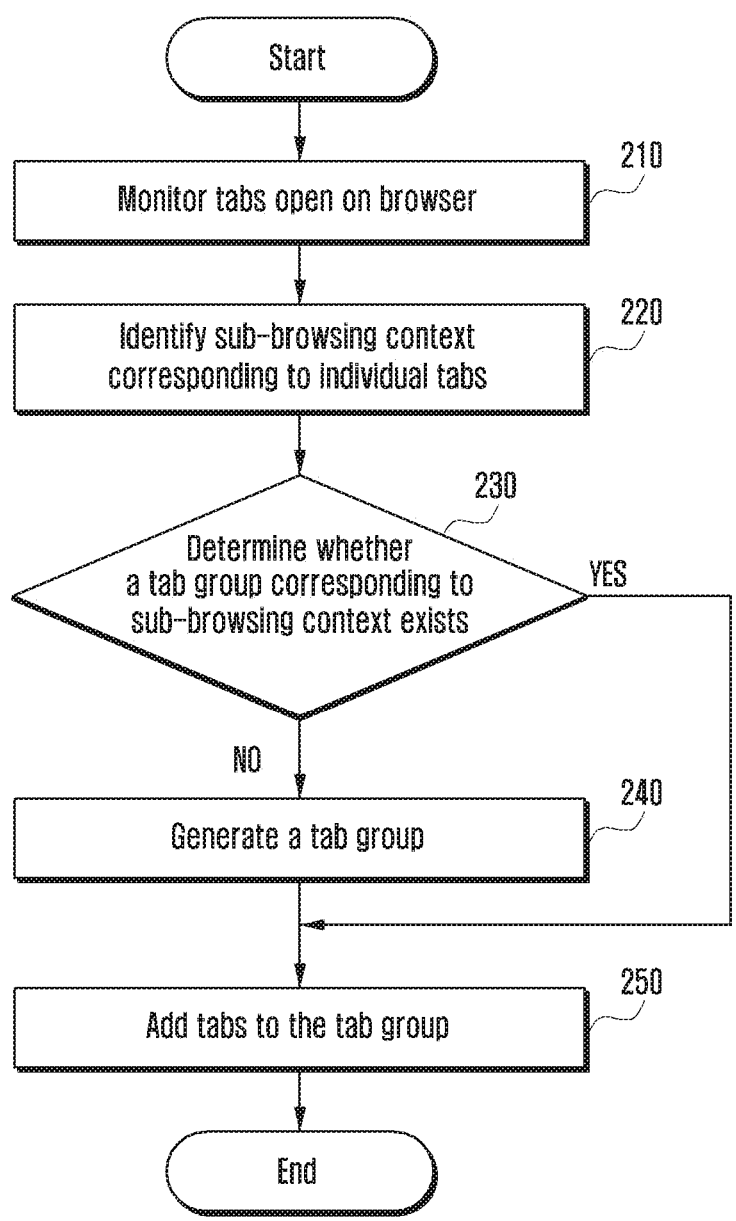
FIG. 2 is a flow diagram that depicts operations involved in the processing of context based group of tabs using the browsing engine, according to various embodiments of the present disclosure.

FIG. 2 is a flow diagram that depicts operations involved in the process of context based group of tabs using the browsing engine, according to various embodiments of the present disclosure.

Referring to FIG. 2, the tab manager module 101 in the browsing engine 100 is capable of monitoring and analyzing at operation 210, tabs that are open on the browser.

By analyzing the contents of the tabs, the tab manager module 101 is capable of analyzing at operation 220, sub-browsing contexts for all tabs that are open. The tab manager module 101 is capable of classifying the tabs based on the sub-browsing contexts related to individual tabs.

For example, all tabs that display a particular content item may be classified as tabs matching a sub-browsing context corresponding to the particular content item. In addition, the tab manager module 101 is also capable of creating tab groups which correspond to identified, different sub-browsing contexts, respectively.

In addition, the tab manager module 101 may also group tabs corresponding to a particular sub-browsing context into a tab group corresponding to a main context containing particular sub-browsing contexts.

The term 'main context' is used in the sense of a general context that can contain sub-browsing contexts. For example, when the sub-browsing contexts are 'a travel to US' and 'a travel to Europe', the main context may be 'travel'. That is, the tab manager module 101 is capable of creating a tab group corresponding to sub-browsing contexts or a tab group corresponding to a more general main context.

In another embodiment, the tab manager module 101 is capable of creating a first tab group corresponding to a main context and second tab group corresponding to sub-browsing contexts in the main context. The second tab groups may be contained in the first group.

Figure 3:
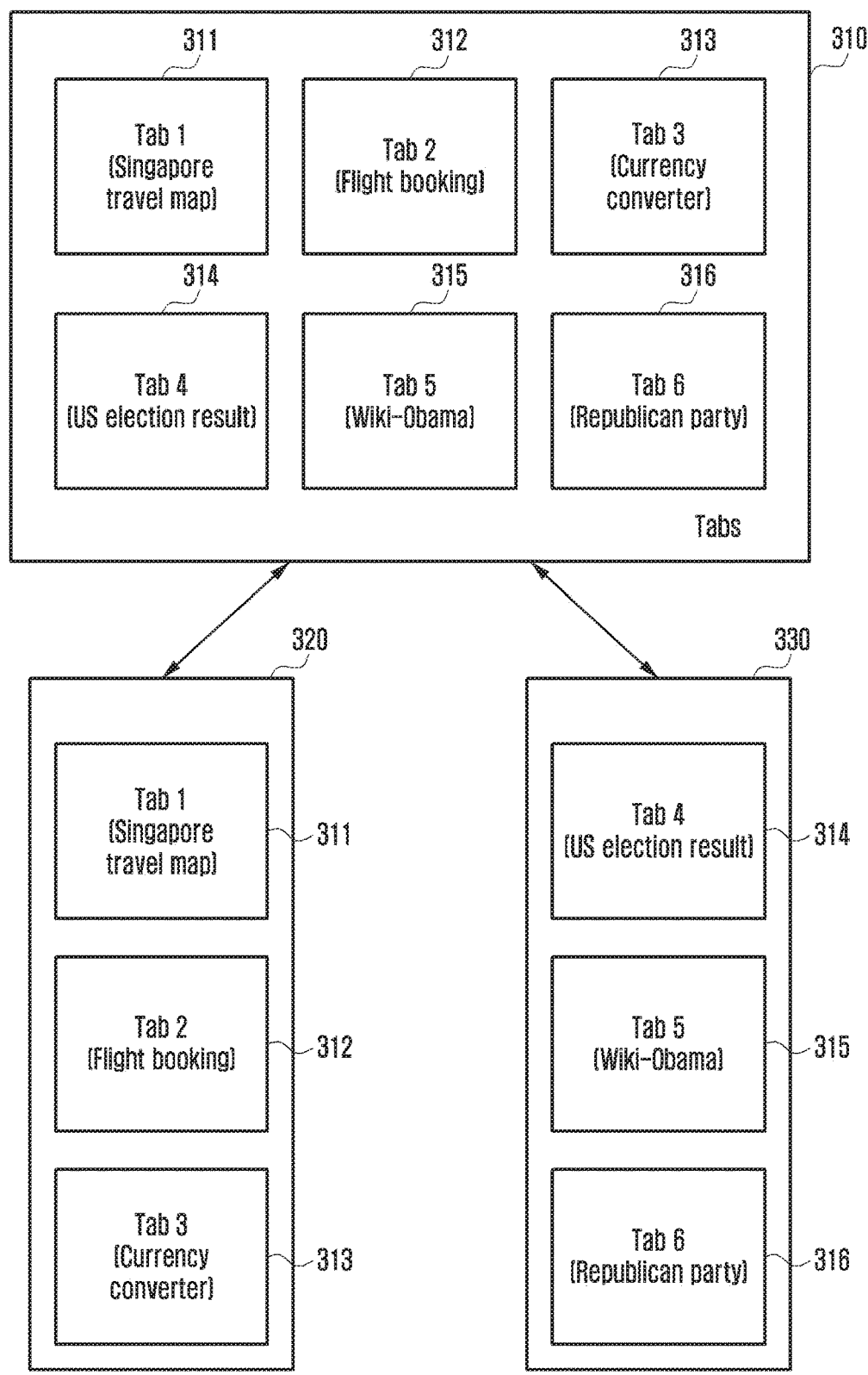
FIG. 3 illustrates a context based grouping of tabs by the UE, according to various embodiments of the present disclosure.

For example, consider the scenario depicted in FIG. 3.

A first tab 311 may be a tab of a sub-browsing context, i.e., Singapore travel map.

A second tab 312 may be a tab of a sub-browsing context, i.e., flight booking.

A third tab 313 may be a tab of a sub-browsing context, i.e., currency converter.

A fourth tab 314 may be a tab of a sub-browsing context, i.e., US election result.

A fifth tab 315 may be a tab of a sub-browsing context, i.e., Wiki-Obama.

A sixth tab 316 may be a tab of a sub-browsing context, i.e., Republican Party.

The sub-browsing contexts corresponding to the first through sixth tabs (311-316) are formed in a general main content 310. The sub-browsing contexts corresponding to the first tab 311, second tab 312 and third tab 313 may be formed into a main content of travel 320.

The sub-browsing contexts corresponding to the fourth tab 314, fifth tab 315 and sixth tab 316 may be formed into a main content of US politics 330.

The user may browse web pages through individual different tabs.

The tab manager module 101 is capable of analyzing tabs and determine whether one or more tab groups corresponding to sub-browsing context(s) exists, in operation 230, and in the embodiment illustrated in FIG. 3, identifying two main contexts, i.e., travel and US politics. The tab manager module 101 is capable of identifying tabs 1, 2, and 3 as the sub-browsing contexts for the main context (travel content 320), and tabs 4, 5, and 6 as the sub-browsing contexts for main context (US politics content 330). The tab manager module 101 is capable of creating different tab groups respectively corresponding to various main contents containing all of the identified sub-browsing contexts in operation 240.

FIG. 3 illustrates a context based grouping of tabs by the UE, according to various embodiments herein of the present disclosure.

Referring to FIG. 3, the tab manager module 101 is capable of creating two tab groups, one for the travel context 320 and the other for the US politics context 330.

The tab manager module 101 is capable of adding tabs to corresponding tab groups at operation 250. Once the tabs have been added to respective groups, then the user is provided with suitable options to navigate between the tab groups, as well as between different tabs in each tab group. For example, when the user selects a tab group, the tabs in that particular tab group may be caused to display to the user in one of the following: a split screen mode, full screen mode, and edge mode (applicable to UEs with edge screen).

When the user selects any tab from the tabs that are listed in the selected tab group, the selected tab can be opened in a split screen mode and/or a full screen mode.

In an embodiment, new tab groups may be created, and the existing tab groups may be updated (by adding or removing tabs), dynamically. Various actions may be performed in the order presented, in a different order or simultaneously. Further, in some embodiments, some actions illustrated in FIG. 2 may be omitted.

Figure 4A:
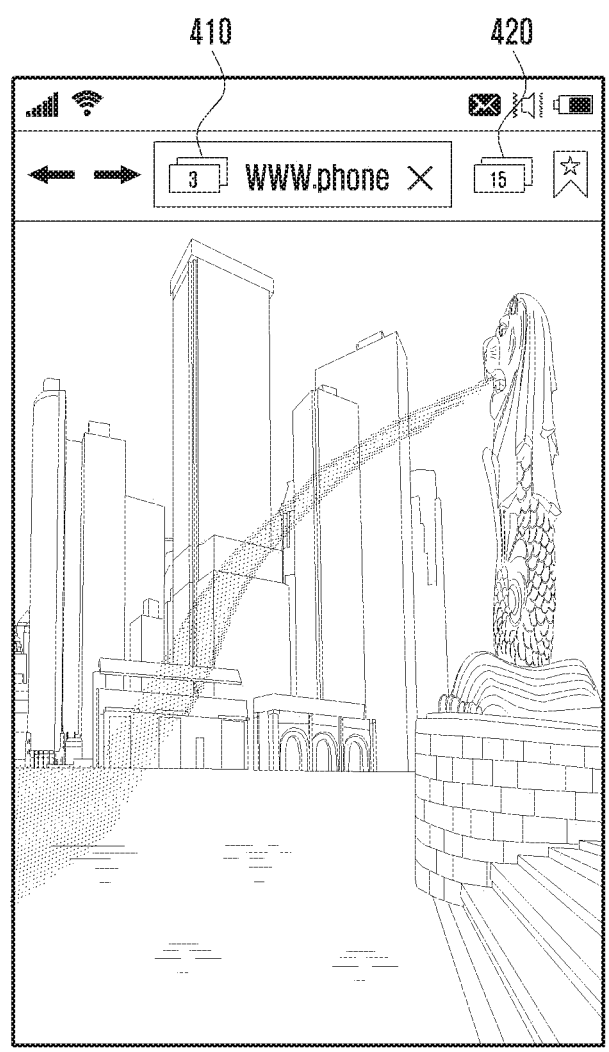
FIGS. 4A, 4B and 4C illustrate a tab manager interface and a tab group manager interface on a browser, according to various embodiments of the present disclosure.
Figure 4B:
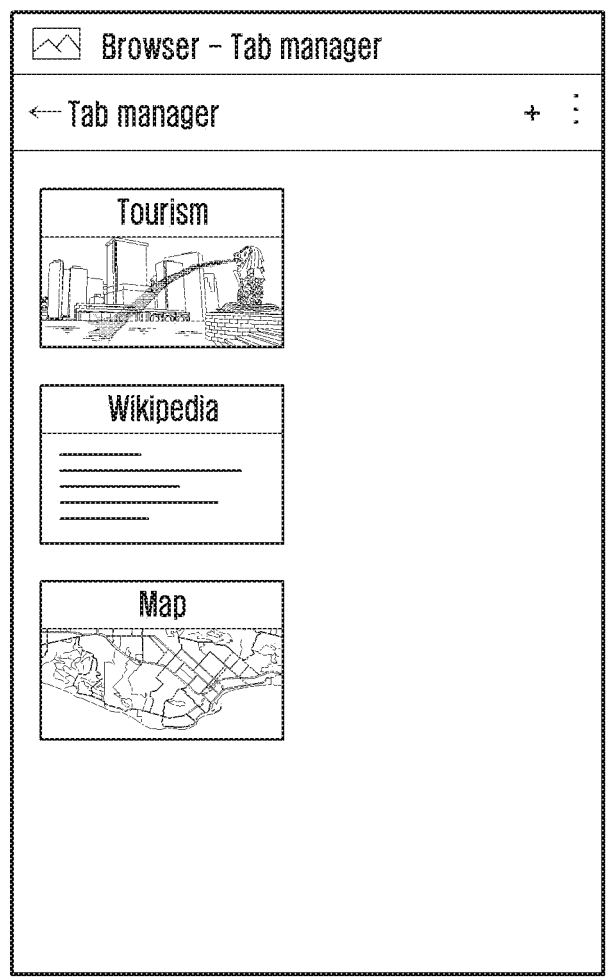
Figure 4C:
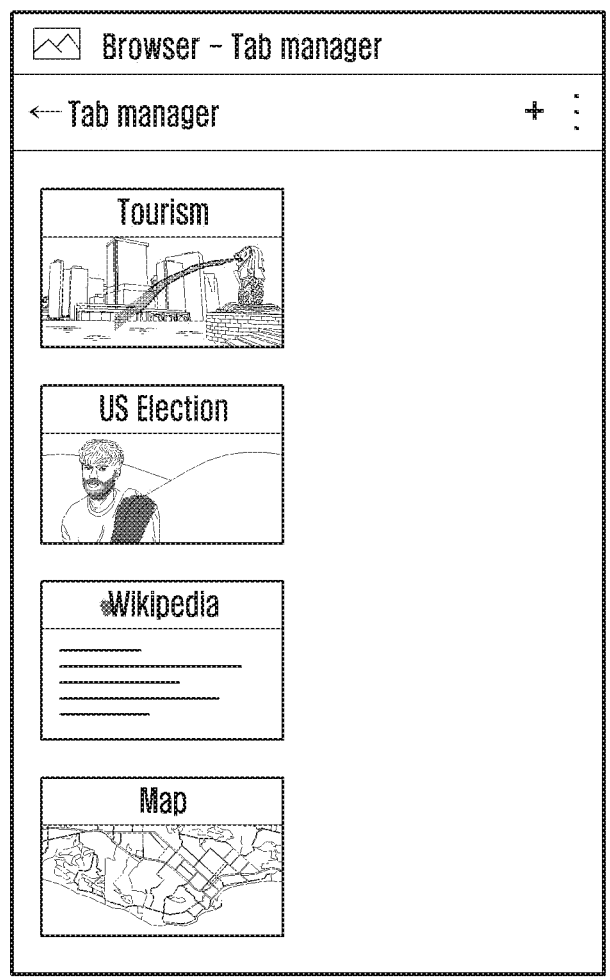

FIGS. 4A, 4B and 4C illustrate a tab group manager interface 410 and a tab manager interface 420 on a browser, according to various embodiments of the present disclosure.

Referring to FIGS. 4A, 4B and 4C, the example disclosed can be configured to provide a tab group manager interface 410 for the user to access individual tabs contained in tab groups and/or a tab manager interface 420 for the user to access one of all the tabs open on the browser.

The user may be allowed to select at least one tab from the list of tabs through the tab group manger interface 410, and a tab group corresponding to the selected tab may be displayed to the user in a suitable format.

For example, when the electronic device according to an embodiment of the present disclosure detects a touch input applied to an area corresponding to a tab group manager interface 410, as illustrated in FIG. 4A, it can output the tab group manager interface 410, as illustrated in FIG. 4B. The user may then be allowed to select one or more tab groups from the displayed list (e.g., Tourism, Wikipedia, and Map), and the same may be displayed to the user in a suitable format.

In one embodiment, it is assumed that a total of 10 tab groups are displayed using a tab group manger interface. If the user selects a first one of the 10 tab groups displayed, second tab group corresponding to a sub-level of the first tab group may be displayed to the user. In this case, it is assumed that the second tab group displayed to the user comprises of 5 tabs. After that, the user may select at least one of the 5 tabs in the second tab group, and the selected tab may be displayed to the user, using a suitable interface.

The tab manger interface 420 may allow the user to access tabs open on the browser.

For example, when the electronic device according to an embodiment of the present disclosure detects a touch input applied to an area corresponding to a tab manager interface 420 shown in FIG. 4A, it can output the tab manager interface 420, as illustrated in FIG. 4C. The tab manager interface 420 is capable of outputting a list of tabs contained in all tab groups in a format of image or text.

FIGS. 5A, 5B, 5C, 5D, 5E and 5F illustrate various stages in the process of browsing tabs using the browsing engine, according to various embodiments of the present disclosure.

Figure 5A:
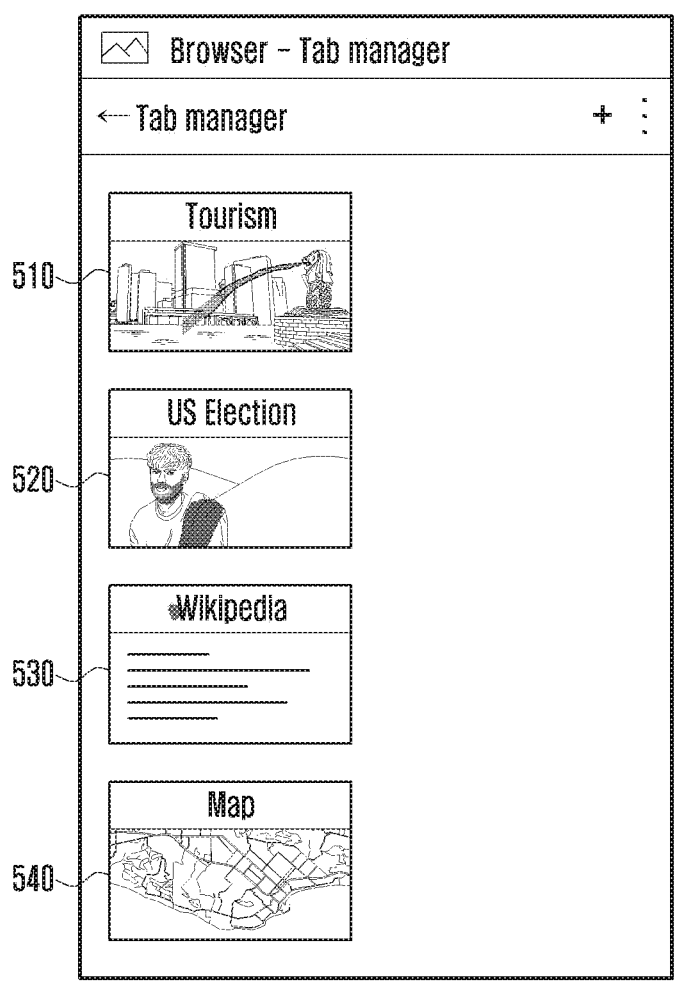
FIGS. 5A, 5B, 5C, 5D, 5E and 5F illustrate various stages in the process of browsing tabs using the browsing engine, according to various embodiments of the present disclosure.

FIG. 5A illustrates tabs with four sub-browsing contexts.

More specifically, a first tab 510 with Singapore tourism as a sub-browsing context, a second tab 520 with US election as a sub-browsing context, a third tab 530 with Wikipedia as a sub-browsing context, and a fourth tab 540 with Map as a sub-browsing context are open on the tab manager interface on the screen.

Figure 5B:
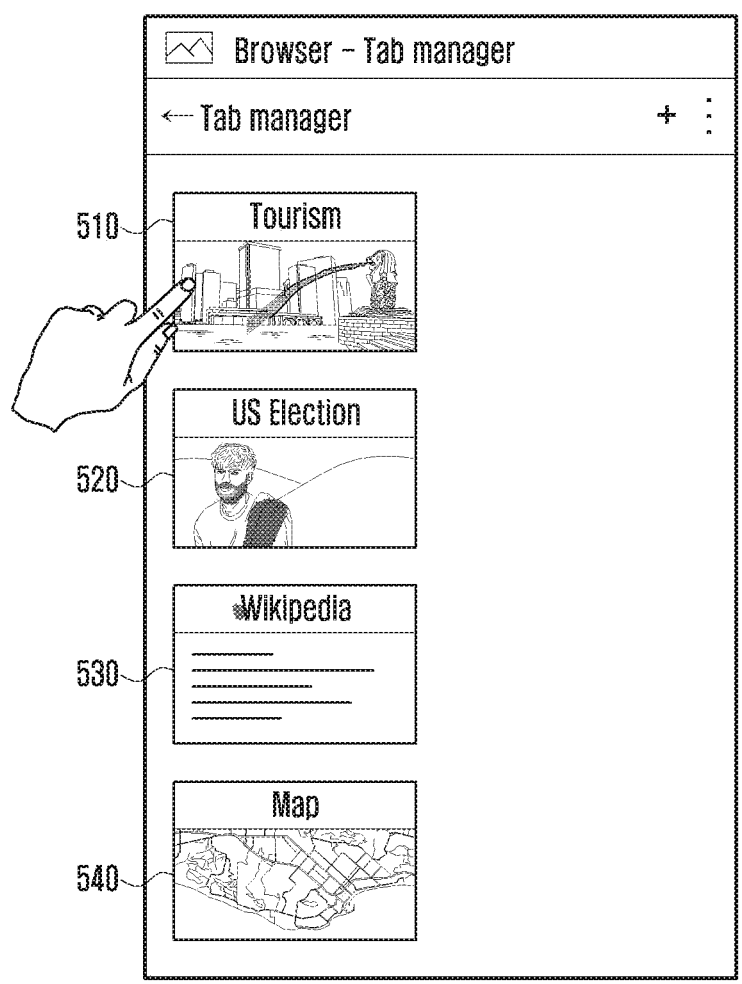
Figure 5C:
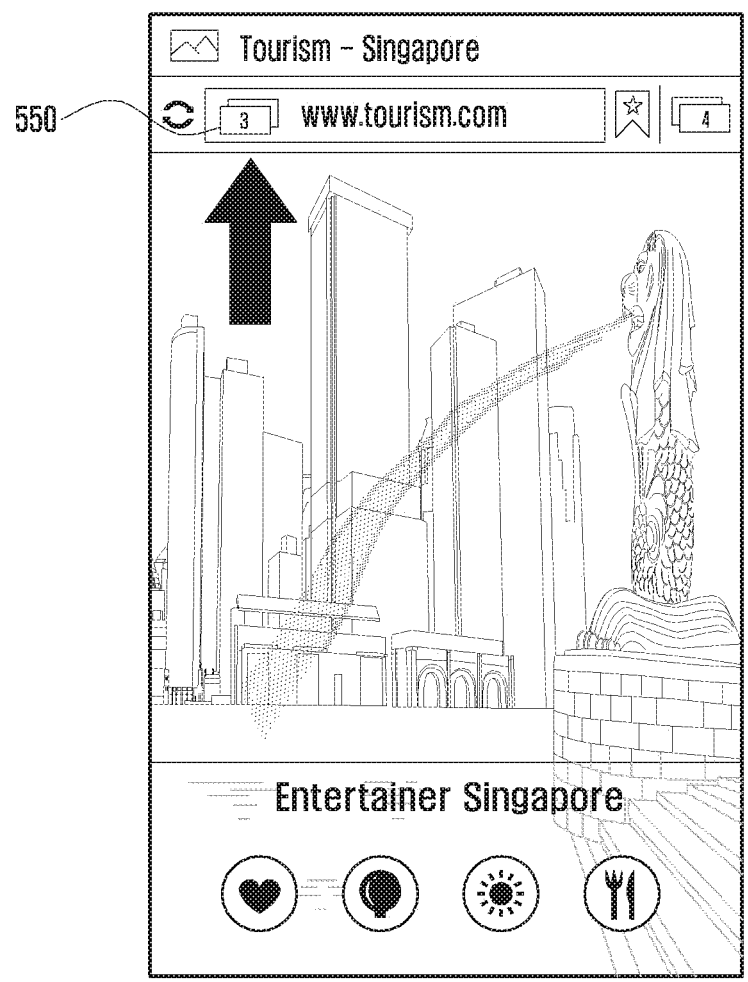

Referring to FIG. 5B, the user may click on the first tab 510, i.e., Singapore tourism. The browser is then capable of displaying a web page corresponding to the first tab 510, as illustrated in FIG. 5C. The browser is capable of identifying the context the user is interested in as 'Singapore tourism.'

Referring to FIG. 5C, the browser is capable of identifying the sub-browsing context related to the first tab as being Singapore tourism and adding the first tab to a tab group corresponding to the sub-browsing context of the first tab. When the tab group corresponding to the sub-browsing context of the first tab does not exist, the browser may add a tab group corresponding to the sub-browsing context of the first tab.

The browser may also provide an interface 550 for the user to access tabs contained in the tab group.

Figure 5D:
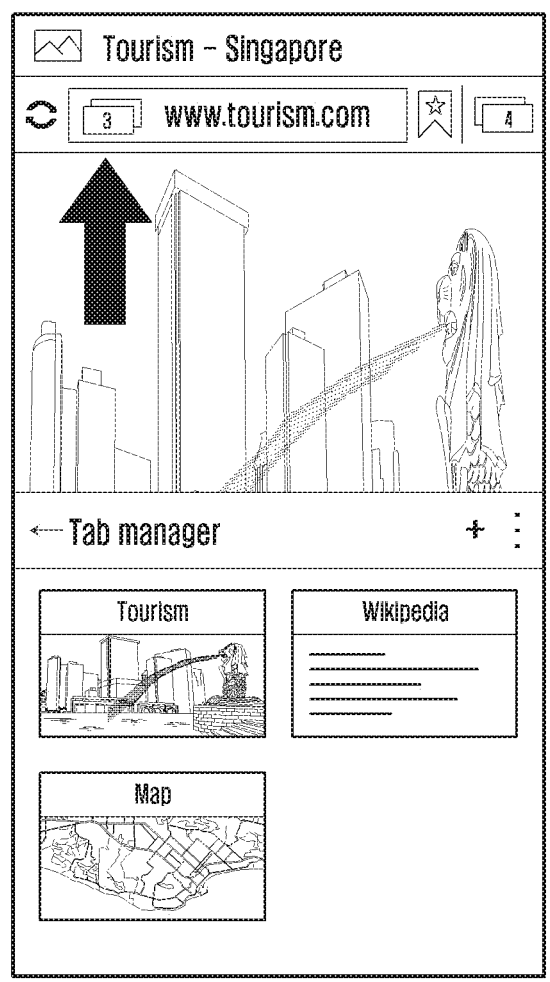

Referring to FIG. 5D, when the user accesses a tab group via the interface 550 (e.g., by touching the interface 550), the content of the tab group may be displayed to the user via a suitable interface.

A list of tabs with a sub-browsing context of the first tab 510, e.g., a sub-browsing context related to Singapore tourism, may be displayed. The user can access one or more content items contained in the tab group, and the accessed content items can be displayed, to the user, in the same window.

The list of tabs can be displayed in one or more of the following interfaces: split screens, the entire screen, and an edge screen.

Figure 5E:
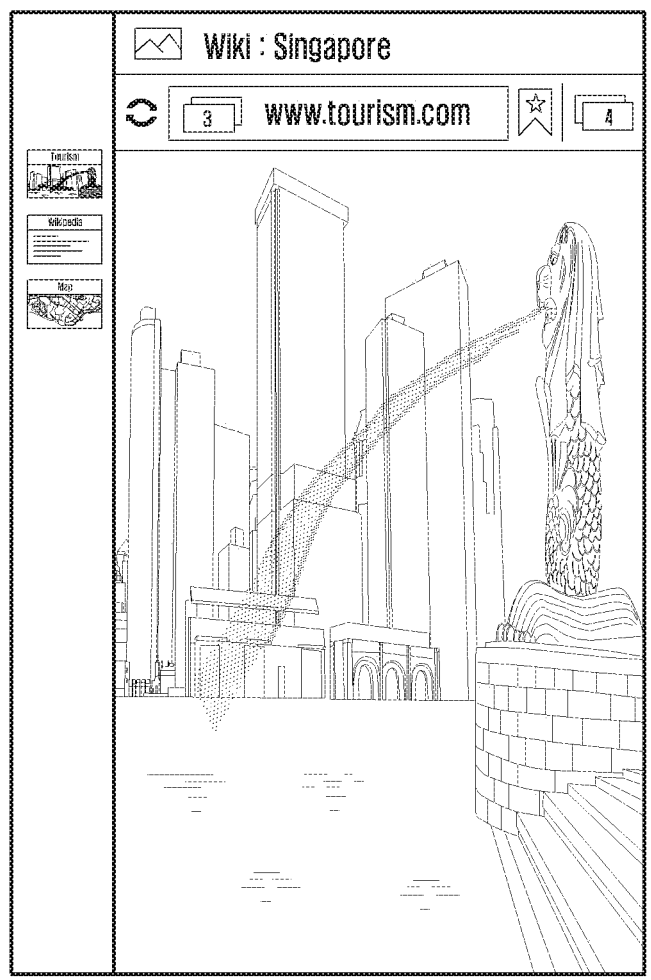
Figure 5F:
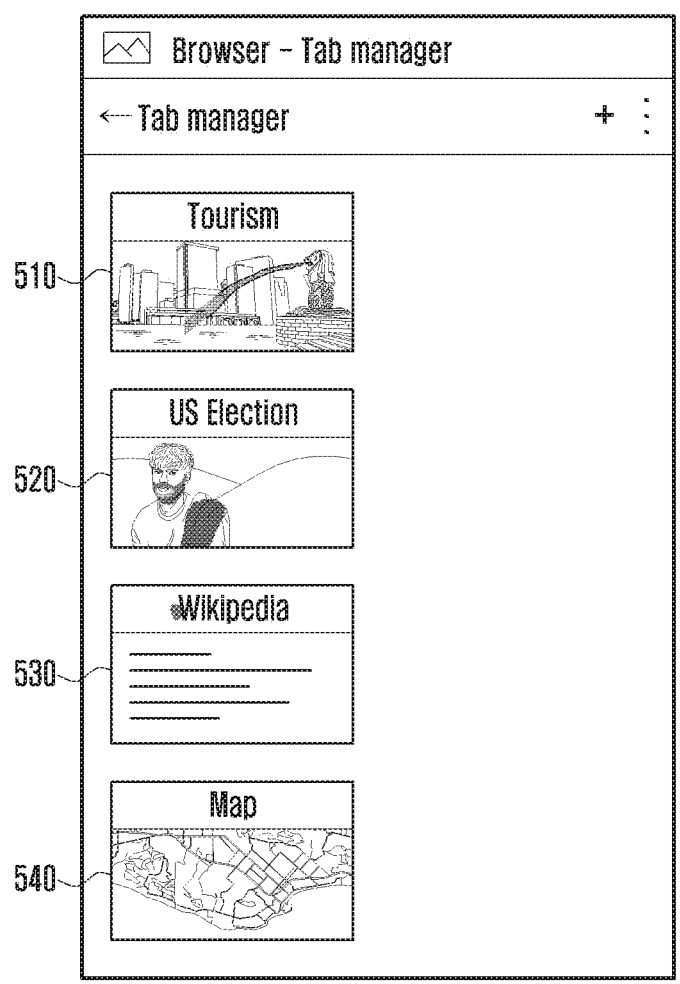

FIG. 5D is a diagram where a tab group is displayed on split screens, FIG. 5E is a diagram where a tab group is displayed on the entire screen, and FIG. 5F is a diagram where a tab group is displayed on an edge screen.

Figure 6:
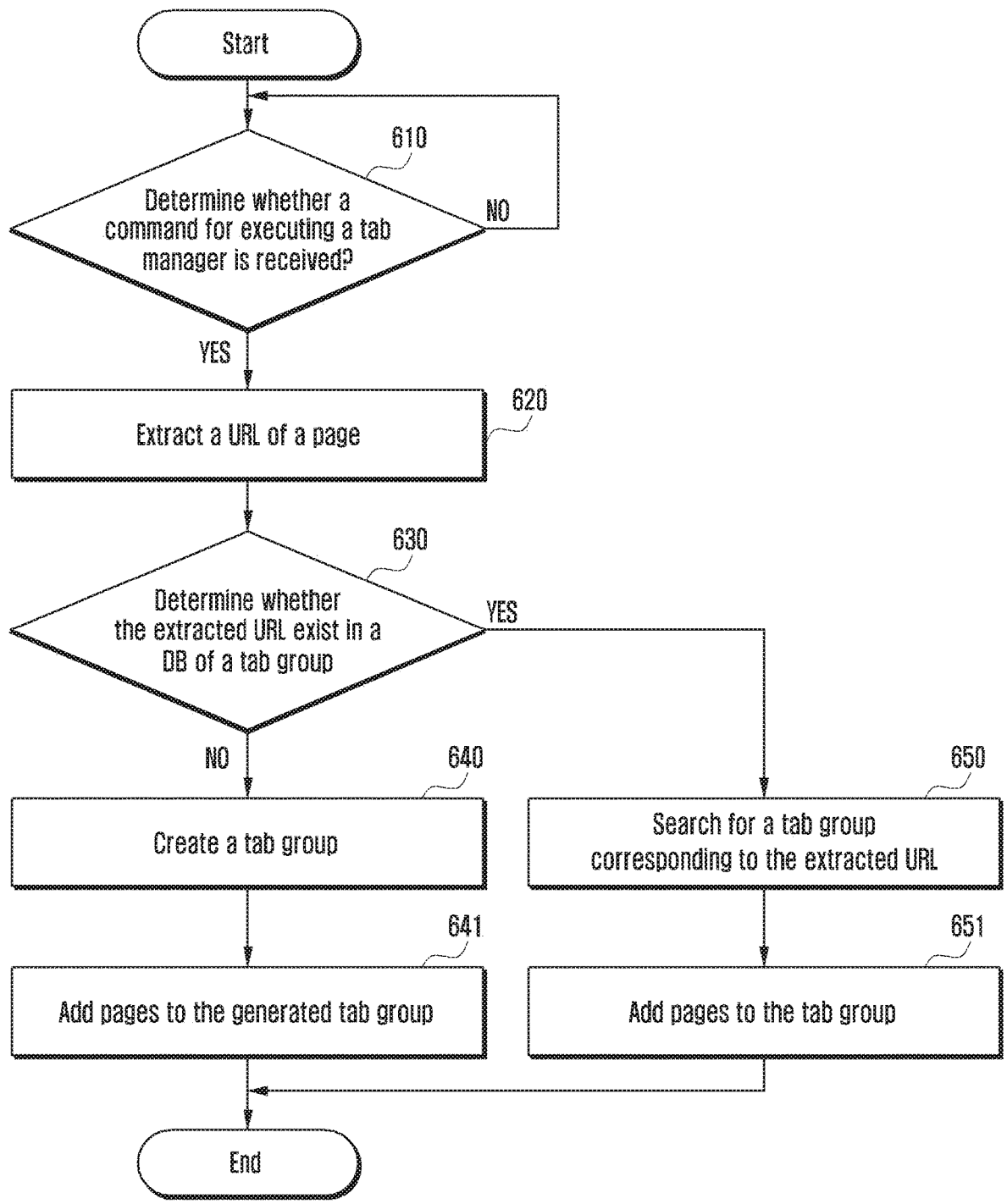
FIG. 6 is a flow diagram that describes a process of adding tabs to a tab group, according to various embodiments of the present disclosure.

FIG. 6 is a flow diagram that illustrate a process of adding tabs to a tab group, according to an embodiment of the present disclosure.

Referring to FIG. 6, the electronic device is capable of determining whether it received a command for executing a tab manager at operation 610.

When the electronic device ascertains that a command for executing a tab manger 101 has been received, it is capable of extracting an URL of a web page at operation 620.

The electronic device is capable of determining whether the extracted URL exists in a database (DB) of a tab group at operation 630.

When the electronic device ascertains that the extracted URL does not exist in a DB of a tab group, it is capable of creating a tab group corresponding to a sub-browsing context related to the web page at operation 640, and adding the web page to the created tab group at operation 641.

On the other hand, when the electronic device ascertains that the extracted URL exists in a DB of a tab group, it is capable of searching for a tab group corresponding to the extracted URL at operation 650, and adding the web page to the searched tab group at operation 651.

Figure 7A:
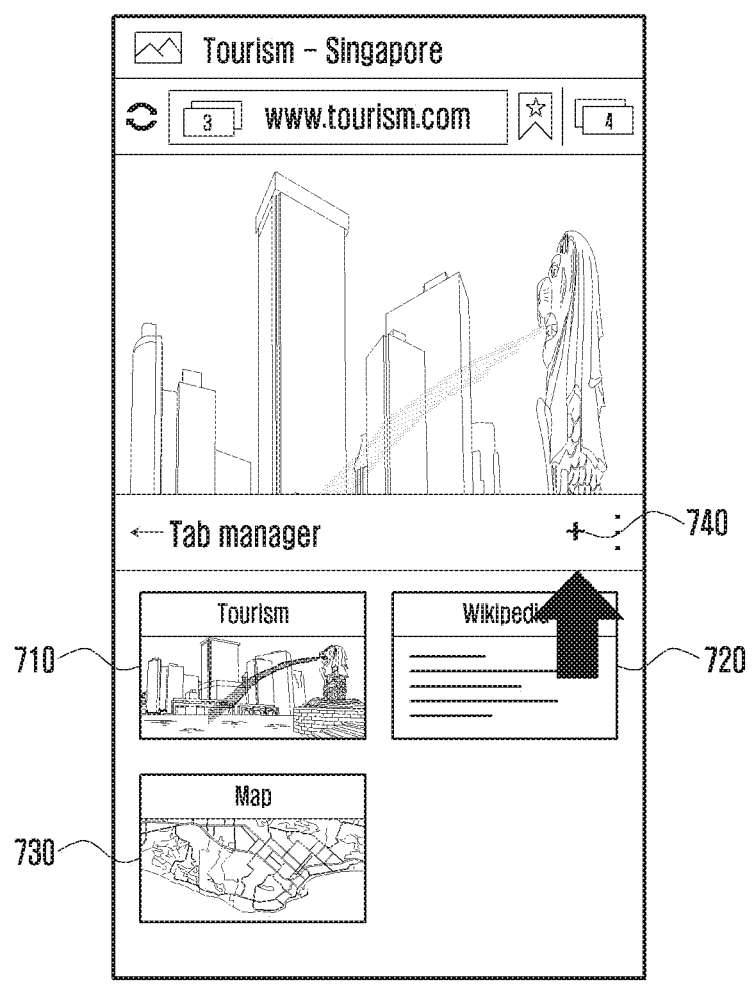
FIGS. 7A and 7B illustrate stages in a process of manually adding a new tab to the tab group according to the flow diagram of FIG. 6.
Figure 7B:
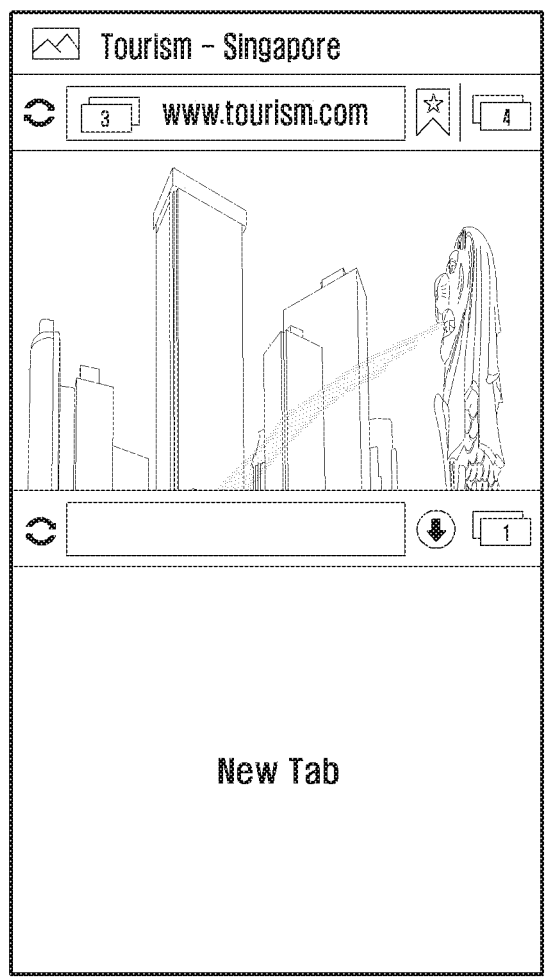

FIGS. 7A and 7B illustrate stages in a process of manually adding a new tab to the tab group according to the flow diagram of FIG. 6.

A list of a first tab 710, a second tab 720 and a third tab 730 can be displayed on the bottom of an interface, and a web page corresponding to the first tab 710 can be displayed on the top of the interface.

Referring to FIG. 7A, the browser is capable of providing at least one interface for the user to add a first tab 710 to a tab group. When the user adds a new tab to a tab group using an interface 740 for adding a first tab 710, the browser can check contexts of a main URL/main page contained in the first tab 710 open thereon. The browser can add a new tab in a tab group related to the checked context.

The browser may automatically add a new tab to a tab group related to a context of a primary URL. After analyzing the primary URL of the new tab and extracting a sub-browsing context, the browser can add a new tab to a tab group corresponding to a main context containing a sub-browsing context, based on the extracted sub-browsing context.

Figure 8:
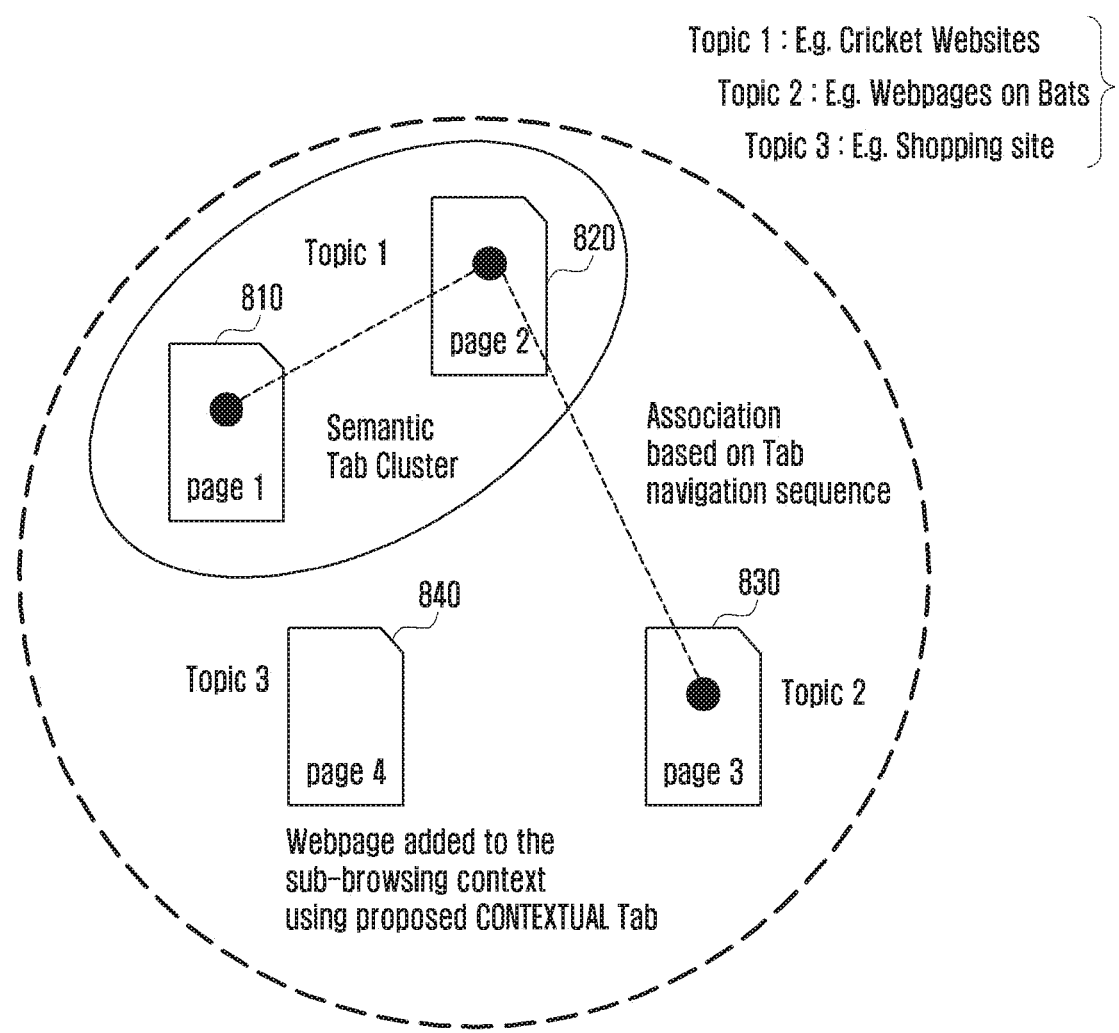
FIG. 8 illustrates an example of how a recommendation is provided to a user based on the sub-browsing context, according to various embodiments of the present disclosure.

FIG. 8 illustrates an example of how a recommendation is provided to a user based on the sub-browsing context, according to various embodiments of the present disclosure.

Referring to FIG. 8, the browser can be configured to infer an 'Intention' of the user, based on different sub-browsing contexts from different tabs that are open on the browser. The browser can provide the user with recommendation based on the user's inferred intention.

In order to identify the user intention, the tab manager module 101 is capable of initially analyzing the tabs and identifying a topic distribution. The 'topic distribution' can provide information about topics that are being viewed as part of the browsing session, based on content extracted from different tabs that are open on the browser. Further, the user intention can be inferred based on the topic distribution.

In the example or scenario depicted in FIG. 8, based on the sub-browsing context, the browser can identify Cricketing websites in a first tab 810 and a second tab 820, extracting a web page containing content on bats used for Cricket in a third tab, and identifying shopping sites in a fourth tab.

Based on relationship between the identified topics, the browser can identify a user's intention as 'buying a cricket bat' and provide the user with suggestion of shopping sites for cricket bats based on the user's inferred intention.

The embodiments disclosed herein can be implemented through at least one software program running on at least one hardware device and performing network management functions to control the network elements. The network elements illustrated in FIG. 1 include blocks which can be at least one of a hardware device, or a combination of hardware device and software module.

The embodiments disclosed herein specify a mechanism for tab management in a browser. The mechanism allows sub-browsing context based grouping of tabs in a web browser, providing a system thereof. Therefore, it is understood that the scope of protection is extended to such a system and by extension, to a computer readable means having a message therein, the computer readable means containing a program code for the implementation of one or more operations of the method, when the program runs on a server or mobile device or any suitable programmable device. The method is implemented in a preferred embodiment using the system together with a software program written in, for example, a very high speed integrated circuit hardware description language (VHDL), another programming language, or implemented by one or more VHDL or several software modules being executed on at least one hardware device. The hardware device can be any kind of device which can be programmed including, for example any kind of a computer like a server or a personal computer, or the like, or any combination thereof, for ex. one processor and two FPGAs. The device may also include means which could be for example hardware means like an application specific computer circuit (ASIC) or a combination of hardware and software means, an ASIC and a field programmable gate array (FPGA), or at least one microprocessor and at least one memory with software modules located therein. Thus, the means are at least one hardware means or at least one hardware-cum-software means. The method embodiments described herein could be implemented in pure hardware or partly in hardware and partly in software. Alternatively, the embodiment may be implemented on different hardware devices, for example using a plurality of central processing units (CPUs).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for tab management in a browser, the method comprising:
    identifying, by at least one processor, a plurality of browsing contexts for a plurality of tabs that are open in the browser based on a semantic analysis of contents of the plurality of tabs, wherein a browsing context includes a subject of content included in a tab;
    assigning, by the at least one processor, a first set of the plurality of tabs to a first main tab group having a first main context based on the identifying of the plurality of browsing contexts, wherein a subject of the first main context is semantically broader than subjects of each of the first set of the plurality of tabs;
    assigning, by the at least one processor, at least two tabs, which are included in the first main tab group, to a sub-tab group having a sub-context based on the identifying of the plurality of browsing contexts;
    displaying, by a display, a user interface and a text indicating the first main context of the first main tab group;
    in response to selection of the user interface to the sub-tab group, displaying a plurality of thumbnail images corresponding to the at least two tabs of the sub-tab group;
    identifying each of topics in the first set of the plurality of tabs based on a semantic analysis of content included in the first set of the plurality of tabs of the first main tab group;
    identifying at least one web site based on a relationship between each of the topics; and
    displaying the at least one web site.

2. The method as claimed in claim 1,
    wherein the identifying of the browsing context further comprises:
        navigating, from a tab displaying a first web page, to a second web page corresponding to a hyperlink in the first web page, and
        identifying the browsing context of the second web page based on the navigation, and
    wherein a first tab displaying the first web page and a second tab displaying the second web page are identical to each other with regard to the browsing context.

3. The method as claimed in claim 1, wherein the identifying of the browsing context further comprises:
    receiving a user input for opening a new tab by a tab manager;
    identifying a context of a uniform resource locator (URL) corresponding to the new tab by the tab manager; and
    identifying the browsing context based on identified context of the URL.

4. The method as claimed in claim 3, wherein the assigning of the tab to the first main tab group further comprises:
    identifying, by the at least one processor, a tab group identical to the identified context of the URL from among a plurality of tab groups; and
    classifying, by the at least one processor, the new tab to the identified tab group.

5. The method as claimed in claim 1, wherein the assigning of the tab to the first main tab group is based on the identified browsing context, a tracking of changes to an order of placement of a plurality of tabs included in the first main tab group, and identified navigation information, by a user, of sites entered on the browser.

6. The method as claimed in claim 1,
    wherein the displaying of the first main tab group to a user further comprises displaying a plurality of tabs included in the first main tab group, and
    wherein the displaying of the plurality of tabs comprises displaying the plurality of tabs based on individual priorities of the plurality of tabs included in the first main tab group.

7. The method as claimed in claim 1, further comprising:
    receiving an input on the at least one of the text; and
    displaying a tab included in the first main tab group.

8. The method as claimed in claim 1, wherein the displaying of the at least one of the text or the thumbnail image comprises:
    dividing a window of the browser into at least two windows including a first window for displaying content of a tab and a second window for displaying the text; and
    displaying the text on the second window.

9. The method as claimed in claim 1, further comprising:
    assigning, by the at least one processor, a second set of the plurality of tabs to a second main tab group having a second main context based on the identifying of the plurality of browsing contexts, wherein a subject of the second main context is semantically broader than subjects of each of the second set of the plurality of tabs, wherein the identifying of each of the topics is not based on browsing contexts of the second set of the plurality of tabs of the second main tab group.

10. The method as claimed in claim 1, wherein a subject of the at least one web site is semantically related to a subject of the first main context of the first main tab group.

11. An electronic device for tab management in a browser, the electronic device comprising:
a display; and
at least one processor configured to:
manage a plurality of tabs that are open in the browser,
identify a plurality of browsing contexts for a plurality of tabs that are opened in the browser, wherein a browsing context includes a subject of content included in a tab,
assign a first set of the plurality of tabs to a first main tab group having a first main context based on the identification of the plurality of browsing contexts, wherein a subject of the first main context is semantically broader than subjects of each of the first set of the plurality of tabs,
assign at least two tabs, which are included in the first main tab group, to a sub-tab group having a sub-context based on the identification of the plurality of browsing contexts,
control the display to display a user interface and a text indicating the first main context of the first main tab group,
in response to selection of the user interface to the sub-tab group, control the display to display a plurality of thumbnail images corresponding to the at least two tabs of the sub-tab group, and
identify each of topics in the first set of the plurality of tabs based on a semantic analysis of content included in the first set of the plurality of tabs of the first main tab group,
identify at least one web site based on a relationship between each of the topics, and
display at least one web site related to the browsing context or the main context.

12. The electronic device as claimed in claim 11, wherein the at least one processor is further configured to:
navigate to a first web page corresponding to a hyperlink in second web page, via a navigation tracking module of the at least one processor;
identify the browsing context based on the navigation; and
determine that a first tab displaying the first web page and a second tab displaying the second web page have an identical browsing context.

13. The electronic device as claimed in claim 11, wherein the at least one processor is further configured to:
receive a user input for opening a new tab;
identify a context of a uniform resource locator (URL) corresponding to the new tab;
identify the browsing context based on the identified context of the URL;
identify a tab group identical to the identified context of the URL from among a plurality of tab groups; and
classify the new tab to the identified tab group.

14. The electronic device as claimed in claim 11, wherein the at least one processor is further configured to:
divide a window of the browser into at least two windows including a first window for displaying content of at least one tab and a second window for displaying the at least one of the text; and
display the text on the second window.

15. The electronic device as claimed in claim 11, wherein the at least one processor is further configured to:
display the plurality of tabs included in the first main tab group; and
display the plurality of tabs based on individual priorities of the plurality of tabs.

* * * * *